United States Patent
Becker et al.

(10) Patent No.: US 7,017,699 B2
(45) Date of Patent: Mar. 28, 2006

(54) DEVICE FOR DETECTING THE WEIGHT LOADED ONTO A VEHICLE SEAT WITH A SENSOR AND SPRING BODY

(75) Inventors: Burckhard Becker, Solingen (DE); Robert Houston, Leichlingen (DE); Siegfried Angerer, Friedberg (DE)

(73) Assignee: C. Rob. Hammerstein GmbH & Co. KG, (DE)

( * ) Notice: Subject to any disclaimer, the term of this patent is extended or adjusted under 35 U.S.C. 154(b) by 0 days.

(21) Appl. No.: 10/274,020

(22) Filed: Oct. 18, 2002

(65) Prior Publication Data

US 2003/0085060 A1    May 8, 2003

(30) Foreign Application Priority Data

Oct. 19, 2001 (DE) ................. 101 52 698

(51) Int. Cl.
*B60R 21/32* (2006.01)
*G01G 19/08* (2006.01)
*G01G 19/52* (2006.01)

(52) U.S. Cl. ............... 180/273; 177/144; 177/154; 280/735

(58) Field of Classification Search ......... 180/273; 280/735; 177/136, 144, 210 R, 154–159
See application file for complete search history.

(56) References Cited

U.S. PATENT DOCUMENTS

| | | | | |
|---|---|---|---|---|
| 4,957,177 A * | 9/1990 | Hamilton et al. | ........... | 177/211 |
| 5,739,757 A * | 4/1998 | Gioutsos | ............ | 340/667 |
| 6,039,344 A * | 3/2000 | Mehney et al. | ............ | 280/735 |
| 6,087,598 A * | 7/2000 | Munch | ............ | 177/144 |
| 6,104,100 A * | 8/2000 | Neuman | ............ | 307/10.1 |
| 6,134,947 A * | 10/2000 | Kwun | ............ | 73/35.12 |
| 6,218,632 B1 * | 4/2001 | McCarthy et al. | ............ | 177/144 |
| 6,323,443 B1 * | 11/2001 | Aoki et al. | ............ | 177/144 |
| 6,397,688 B1 * | 6/2002 | Sakamoto et al. | ............ | 73/862.637 |
| 6,448,512 B1 * | 9/2002 | Cooper | ............ | 177/144 |
| 6,748,814 B1 * | 6/2004 | Ishida et al. | ............ | 73/862.391 |
| 6,759,603 B1 * | 7/2004 | Curtis et al. | ............ | 177/144 |
| 2002/0059840 A1 | 5/2002 | Houston et al. | | |
| 2003/0106723 A1 * | 6/2003 | Thakur et al. | | |

FOREIGN PATENT DOCUMENTS

GB    2 352 525 A    1/2001

* cited by examiner

*Primary Examiner*—Randy W. Gibson
(74) *Attorney, Agent, or Firm*—Akerman Senterfitt

(57) ABSTRACT

A device for detecting the weight loaded on a vehicle seat with a sensor (22) and a spring body (24) that connects the vehicle seat to an underbody (18) of a corresponding motor vehicle and is connected, in one fastening area (e.g., 28), with a bottom rail (20) of the vehicle seat on the one hand and, in another fastening area (e.g., 26), to the underbody (18) of the corresponding motor vehicle on the other hand. One of the mounting areas is provided with a bore (38) through which a seat fastening screw (30) is engaged. The sensor (22) is provided with a travel sensor which is disposed parallel to the seat fastening screw (30) between the two fastening areas (26, 28) or to these rigidly connected parts (retaining plate 60 for example) and which measures the distance of these fastening areas (26, 28) parallel to the seat fastening screw (30).

7 Claims, 1 Drawing Sheet

DEVICE FOR DETECTING THE WEIGHT LOADED ONTO A VEHICLE SEAT WITH A SENSOR AND SPRING BODY

BACKGROUND OF THE INVENTION

The invention relates to a device for detecting the weight loaded on a vehicle seat with a sensor and a spring body that connects the vehicle seat to an underbody of a corresponding motor vehicle and is connected, in a first fastening area, with a bottom rail of the vehicle seat on the one hand and, in a second fastening area, to the underbody of the corresponding motor vehicle on the other hand, one of these mounting areas being provided with a bore through which a seat fastening screw is engaged.

Such type detection devices are known and have been described for example in DE 100 55 619 A or DE 100 36 479 A. It is characteristic and substantial for this detection device that it be arranged between bottom rail and underbody. Usually, vehicle seats are detachably fastened to the underbody at four screw connection points by means of four seat fastening screws. The invention only relates to such detection devices of the type mentioned herein above in which the weight of the vehicle seat and of its occupancy, a passenger or a load, is measured in the region of these seat fastening points. At least three, preferably four, detection devices are provided for each vehicle seat. Through the different indications given by these detection devices it is possible to detect whether the vehicle seat is more loaded in its rear region, or more on its left side, and so on. In the event of an accident, it can be detected whether the vehicle seat is loaded or unloaded.

In the detection devices of the type mentioned herein above, the sensor is configured to be a resistance strain gauge and is located on the spring body. The sensor detects the bending of the spring body between the two fastening areas.

These previously known detection devices have proved efficient. The advantage thereof is that spring body and sensor are forming a unit and that they do not need to be separately mounted as a result thereof. They are also very sensitive and are capable of detecting variations of less than one kilogram in the weight loaded onto the vehicle seat.

However, the prior art detection devices also have disadvantages. The effective distance moved by the two fastening areas relative to each other when the weight loaded on the vehicle seat changes, i.e., the deflection and expansion of the spring body, is converted into a considerably smaller change in a region located between the two fastening areas. Since the bending variations are so small, several resistance strain gauges, which are disposed on the two facing main surfaces of the spring body, are usually used.

Another disadvantage is that the spring body must be designed in such a way that it is provided with optimum spring properties in the weight range of concern of for example 0–100 kg while still being highly resistant to tearing out in the event of an accident, since, according to prior art, the vehicle seat is connected to the underbody via the unit consisting of spring body and sensors so that tensile loads, which occur for example in the event of frontal crashes, are transmitted through the spring body.

Furthermore, resistance strain gauges are not fatigue- and wear-free. They are known to be capable of failing after having been subjected to a certain number of loads. Finally, the resistance strain gauges must be isolated from the surface of the mostly metallic spring body, which requires additional expenditure.

SUMMARY OF THE INVENTION

This is where the invention comes to bear. The invention is directed to develop the detection devices of the type mentioned herein above while still keeping the substantial advantages thereof in such a manner that the realization of the spring body is simplified and the sensor is configured in such a manner that the effective travel variations may be detected directly as well.

In view of the detection device of the type mentioned herein above, the solution to this object is to configure the sensor to be a travel sensor which is disposed parallel to the seat fastening screw between the two fastening areas or to these rigidly connected parts and which measures the distance of these fastening areas parallel to the seat fastening.

Furthermore, the invention utilizes a spring body. The function of said spring body still is to connect the vehicle seat to the underbody on at least several, preferably all, of the four seat fastening points. The spring body is the spring element that deflects or expands in response to a change in the load exerted onto the vehicle seat. In accordance with the invention, the thereby occurring changes in the distance between the vehicle seat and the underbody are now directly detected by the travel sensor. In principle, said travel sensor is independent of the spring body. The great advantage thereof is that the spring body can be of any configuration and needs no longer be designed in such a manner that a change in its bending may be optimally scanned by resistance strain gauges.

The travel change that occurs as a result of the variations in the load exerted onto the vehicle seat is now directly detected and is no longer strongly reduced as this was the case according to the state of the art. As a result thereof, wear-free travel sensors, preferably inductive sensors, may be utilized. The sensors meant are more specifically travel sensors in which the coil is a component part of an oscillator circuit which, in turn, is a frequency determining element for an oscillator. The deviation between the oscillator frequency and an output frequency is detected and is indicative of the change in the load on the vehicle seat.

Travel sensors are known in principle. They are offered for sale by Balluff GmbH, Schunwaldstr. 9, D-73765 Neunhausen for example.

In the detection device in accordance with the invention the spring body may now be configured to be quite short and quite flat as well. Since travel sensors are capable of detecting relatively small changes in travel, the spring body may be much more rigid than in prior art devices. More specifically, the spring body may now have only one first fastening area and only one second fastening area. Prior art devices are provided with one first and with always two second fastening areas. Accordingly, the prior art spring body is more complicated.

In the detection device in accordance with the invention the actually sensitive element, the sensor, may be advantageously arranged, more specifically in such a manner that it is protected. It now needs no longer be located in the intermediate space between the vehicle seat and the underbody but may for example be protectedly disposed within a hollow space of a couple of rails or underneath the underbody. The sensor may be encapsulated. It may be configured to be dust tight and water protected. A travel sensor may advantageously be connected to an electronics unit which is part of the detection device.

In a preferred development the displacement transducer is an inductive transducer. It is provided with a magnet core and with a coil. The magnet core is guided within the coil and is movable relative thereto. The magnet core is assigned to the one fastening area and the coil to the other fastening area. Oscillators provided with such type transducers are capable of very accurately detecting the smallest travel variations. They are largely insensitive to ageing, dirt, humidity and temperature variations. Other configurations of the transducer, e.g., capacitive or optical transducers, are also possible.

In a development of this embodiment of a transducer configured to be an inductive transducer, an elastic protective sheathing, which encircles the magnet core, is disposed between the coil and the one fastening area. The transducer is closed from the outside as a result thereof. The other end of the coil can be covered by simple means. The magnet core usually does not protrude from said other end of the coil. Should it do so, the, cover may be configured to provide enough space for the magnet core. Such a protective sheathing may also be utilized in other embodiments of the transducer.

In a preferred embodiment, the spring body is a leaf spring, more specifically a bent leaf spring. The two fastening areas are preferably offset in a longitudinal adjusting direction of the vehicle seat relative to the underbody. They may however also be arranged across said direction. The spring body may also be of an annular configuration in which a fastening area surrounds the other at least in parts, e.g., 180.degree. or completely.

The detection device in accordance with the invention is suited to be assigned from the start either to the underbody or to the seat. The detection device in accordance with the invention is arranged either on the vehicle seat or on the underbody before vehicle seat and underbody are screwed together by means of the seat fastening screws. For this purpose, it is advantageous when the spring body in one of the two fastening areas is connected to either the bottom rail or the underbody and when the other fastening area is mounted by means of the seat fastening screw.

The spring body may also preferably be connected permanently in one of its two fastening areas with either the bottom rail or the underbody. Accordingly, it is also possible to configure the spring body to be a portion of the bottom rail of a couple of rails or a portion of the underbody. More specifically, said portion is preferably shaped like a tongue. The portion may be connected to, and be integral with, the bottom rail or the underbody.

In a particularly preferred embodiment the seat fastening screw detachably but firmly screws one of the fastening areas to the underbody, the other fastening area being connected to the bottom rail, said bottom rail having an opening and the seat fastening screw protruding freely from said opening upward. The seat fastening screws transfers the position of the underbody into the region of the bottom rail. The travel sensor may be advantageously arranged as a result thereof, it is rigidly connected to the seat fastening screw either directly or indirectly via intermediate parts on the one side and is fastened to the bottom rail on the other side.

In a particularly preferred development of this just described embodiment there is provided a retaining plate that is connected to the seat fastening screw, is located above the opening of the bottom rail and straddles the opening of said bottom rail. This retaining plate permits to practically achieve the same resistance to tearing out for the seat fastening as with a vehicle seat directly disposed on the underbody, that is to say without a detection device arranged therebetween. Furthermore, the transducer can be fastened to said retaining plate.

The coil is preferably covered with a magnet core. As a result thereof, interfering fields are screened and the magnetic flow is enhanced. The indication sensitivity is thus improved.

Further advantages and characteristics of the invention will become apparent in the claims and in the following non restrictive description of embodiments thereof, given by way of example only with reference to the drawings.

DETAILED DESCRIPTION OF THE DRAWINGS

Figure 1:
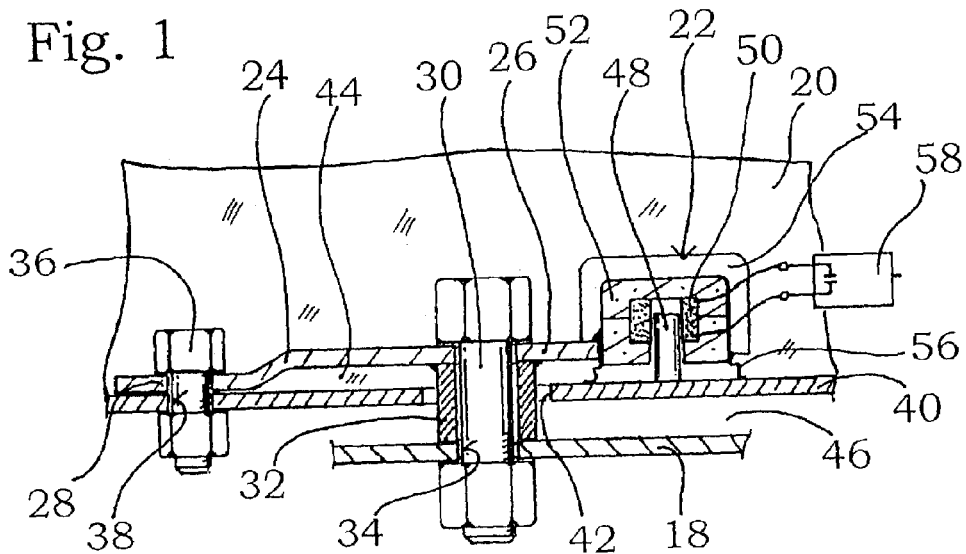
FIG. 1 is a sectional side view with a section plane oriented vertically and parallel to the longitudinal adjusting device of a portion of a bottom rail and a portion of an underbody.

The detection device is arranged between a vehicle seat and an underbody 18. In the FIGS. 1 through 3, only one respective bottom rail 20 of the vehicle seat is partially shown. It is engaged, in a manner well known in the art, with a seat rail which, in turn, carries the seat frame. This is the state of the art. The underbody 18 also is only represented by a flange.

The detection device has a sensor 22 that will be discussed below and a spring body 24. In the exemplary embodiment according to FIG. 1 it is cut out of a steel plate to form a substantially rectangular blank and is offset once, meaning, it is double arcuate. It is substantially configured to be a leaf spring. It has a first fastening area 26 and a second fastening area 28. Each of them is provided with one bore. Another configuration, in the form of a screw socket, a weldable region and so on is possible. A seat fastening screw 30 of the same type as those utilized for fastening vehicle seats in motor vehicles that are not provided with a detection device extends across the bore of the first fastening area 26. Furthermore, the seat fastening screw extends across a socket-shaped distance piece 32 and a hole 34 provided in the underbody 18. A nut to which the screw is firmly but removably screwed is provided below said hole 34. Accordingly, the spring body 24 is generally rigidly connected to the underbody 18 in the first fastening area 26 thereof.

A screw 36 extends across the bore of the second fastening area 28 and further across a bore 38 provided in a bottom plate 40 of the bottom rail 20.

It is firmly screwed to a nut. The second fastening area 28 is thus firmly connected to the bottom rail 20.

Other ways of fastening the second fastening area 28 to the bottom rail 20 are possible. It may be fastened by spot welding, a rivet may be utilized, and so on.

The second fastening area 28 may be configured in such a manner that it is permanently attached to the bottom rail 20—or, in an alternative, to the underbody 18. In the exemplary embodiments according to the FIGS. 1 through 3, the spring body 24 is more or less permanently connected to the bottom rail 20. It is possible to simply rotate all of the three drawings 180 degree and to substantially interchange the reference numerals of bottom rail 20 and underbody 18. A kinematic inversion is thus obtained in the fastening of the spring body 24 to the underbody 18 in the second fastening area 28.

The second fastening area 28 is always configured in such a manner that a more or less permanent attachment of the spring body 24 to its associated part, that is, the bottom rail 20 in particular, or, in the alternative embodiment, the underbody 18 is achieved. During the mounting procedure, the vehicle seat is then (preferably detachably) connected to the underbody 18 by way of the seat fastening screw 30 provided in the first fastening area 26. The last mentioned connection substantially corresponds to the prior art connection for vehicle seats without detection device.

The bottom rail 20 is provided with an opening 42 in the region of the seat fastening screw 30. It has sufficiently large dimensions to prevent the rim of the opening 42 from coming into contact with the distance piece 32. When the weight loaded onto the seat changes, said opening 42 and distance piece 32 move relative to each other. On this change in the load, the distance in a gap 44 between spring body 24 and bottom plate 40 is reduced and a space 46 located between bottom plate 40 and underbody 18 increases. Gap 44 and space 46 are dimensioned and realized as follows: when maximum load is exerted onto the vehicle seat, the height of space 46 is reduced to zero. When the bottom rail 20 is subjected to a high, upward directed tensile load, e.g., in the event of a load exerted during a frontal crash, the gap 44 is reduced to zero. The spring body 24 additionally prevents the bottom rail 20 from detaching from the underbody 18.

The sensor 22 will be described below: in the exemplary embodiment in accordance with FIG. 1 it is arranged between the free, right end of the spring body 24 and the bottom plate 40. In principle it could also be disposed at another location at which the full motion travel occurs in the event of changes in the load such as between bottom plate 40 and underbody 18 or between distance piece 32 and bottom plate 40 for example. The sensor 22 detects the travel variations parallel to the seat fastening screw 30. In FIG. 1 it is configured to be an inductive transducer. It has a magnet core 48 made from ferrite with a very high permeability in excess of 100 for example, preferably in excess of 500 and in excess of 1000. It is configured to form a short cylinder body and is connected to the bottom plate 40 from which it projects vertically upward. It is encompassed by a coil 50 into which it engages over approximately half its length in the resting condition. It engages so far that an optimal change in inductance is achieved when the coil 50 and the magnet core 48 move relative to each other.

A two-part casing, which is also made of ferrite, surrounds the coil 50. It is only open to the bottom in the region of an opening which is located beneath the interior space of the coil 50. Housing 52, together with coil 50 firmly attached thereto, is firmly connected to the right free end of spring body 24 by way of a carrying part 54 made of plastic material for example. The arrangement described is now open in the region of an annular gap between magnet core 48 and housing 52 and is completely encapsulated for the rest. By way of an elastic, annular protective sheathing 56 made of a soft plastic material or rubber for example housing 52 is tightly connected to the bottom plate 40. The annular gap between magnet core 48 and coil 50 is configured to be as thin as possible.

The geometric situation is chosen so that the magnet core 48 is capable of moving freely within coil 50 and housing 52. It may be guided by suited sliding means. The magnet core 48 is only allowed to abut on the housing 52 after spring body 24 has hit the bottom plate 40. Put another way, the mechanical catches are to come into operation sooner than a contact is established in axial direction within sensor 22.

Coil 50 is connected to an oscillator 58 through two connecting lines. A capacitor (see FIG. 1) also pertains thereto and forms, together with coil 50, the frequency determining oscillator circuit of oscillator 58. Any relative movement between magnet core 48 and coil 50 results in a change in the resonance frequency of the oscillator circuit and, as a result thereof, in a change in the oscillator frequency. This change in the oscillator frequency is indicative of the change in the weight loaded onto the vehicle seat.

A second oscillator circuit built according to the same principle may be arranged in immediate proximity to the sensor 22, the magnet core 48 being fixed relative to the coil 50 in this circuit though. The resonance frequency of this second oscillator circuit corresponds to the resonance frequency of the oscillator circuit of the sensor in the resting condition. This permits to compensate for environmental influences such as temperature variations and so on. Only the difference between the frequency of the second, firmly attached oscillator circuit and of the oscillator circuit of the sensor 22 is detected. In the other embodiments, a second sensor may also be additionally provided for reference.

The exemplary embodiment in accordance with FIG. 2 will be discussed below: in this exemplary embodiment, the spring body 24 is not located above the bottom plate 40 and, accordingly, within the interior of the bottom rail, but between bottom rail 20 and underbody 18. Now, two second fastening areas 28 are provided, the spring body 24 is a component part which displays mirror-image symmetry across a mirror plane extending through the axis of the seat fastening screw 30 and across the longitudinal direction of the rails. The spring body 24 is now bent twice in order to achieve sufficient spring travel. In principle, it is possible to utilize for a spring body 24 a plane leaf spring. The spring travels required must then be realized in that the bottom plate 40 is stamped accordingly in order to cause the gap 44 to form.

In its central region, which is also provided with the bore of the first fastening area 26, the spring body 24 is in direct contact with the underbody 18. Its second fastening areas 28 are durably connected to the bottom plate 40. Again, a weld joint, a rivet joint or any other fastening possibility can be provided instead of the screw connection shown.

The seat fastening screw 30 extends across a retaining plate 60 located above the opening 42 of the bottom plate 40. The retaining plate 60 is connected to, and integral with, the distance piece 32. Together with the neighboring parts, the retaining plate 60 is designed such that the bottom plate 40 is not allowed to release toward the top even in the event of high forces generated by an accident.

Now, the sensor 22 is configured to be a commercially available, inductive transducer as it is offered for sale by the firm of Balluff for example. In contrast to all of the other exemplary embodiments, this sensor 22 is not provided with two relatively movable parts like e.g., magnet core 48 and coil 58, but here, magnet core 48 and coil 58 are firmly associated. Sensor 22 is firmly connected to the right, free end of the retaining plate 60. A ferrite plate 62 is located underneath the downward oriented front face thereof, said ferrite plate being fastened, e.g., bonded, to the upper side of the bottom plate 40. In principle, such a ferrite plate 62 is not necessary but it increases the sensitivity of the travel measurement performed by an inductive transducer of a standard construction as it is utilized in FIG. 2.

Figure 3:
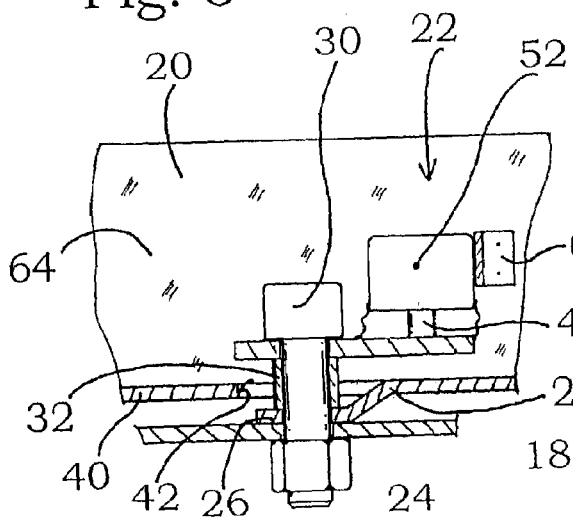
FIG. 3 is a sectional side view with a section line like in FIG. 1, but of another exemplary embodiment

In the embodiment in accordance with FIG. 3, the spring body 24 is formed by a tongue that is bounded by a substantially U-shaped cut in the bottom plate 40 and is bent downwardly outward. It directly contacts the underbody 18 on its lower face. Again, a retaining plate 60 is provided. A distance piece 22 is again located between said retaining plate and the first fastening area 26. Sensor 22 is configured similar to that in FIG. 1. The magnet core 48 thereof is now connected to the retaining plate 60 from which it projects vertically upward. A holding part 66 projects from a side wall 64 of the bottom rail across the longitudinal direction of the rails into the hollow space of the rail. It carries coil 50 and housing 52, i.e., the other part of sensor 22. A protective sheathing 56 is again provided. The configuration in accordance with FIG. 3 allows rolling bodies arranged in the interior space between bottom rail 20 and a corresponding seat rail to move until almost reaching the seat fastening screw 30. The retaining plate 60 again permits to achieve a high resistance to tearing out.

Figure 4:
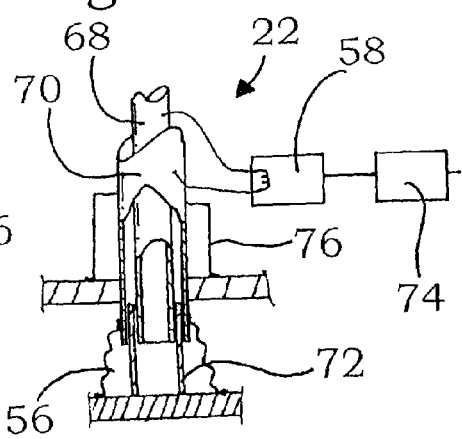
FIG. 4 is a sectional view of a capacitive travel sensor.

FIG. 4 shows a capacitive sensor 22. A coaxial arrangement of an inner electrode 68 and of an outer electrode 70 is rigidly connected to the bottom plate 40. The two electrodes 68, 70 are realized by metal tubes. The outer electrode 70 extends across a hole of the bottom rail 20 that is adapted thereto. The two electrodes 68, 70 end on the same level at their lower end. An annular cylindrical gap is left free between the two electrodes 68, 70. A tubular body 72 protrudes into said gap and performs the function of the magnet core 48. It is made of a material provided with the highest possible permittivities, which should be clearly in excess of 100, preferably in excess of 500 and in any case be as high as possible. The body 72 preferably is a ceramic tube. It is connected to the underbody 18. Each relative movement between underbody 18 and bottom rail 20 causes the body 72 to plunge more or less into the gap between the electrodes 68, 70. The capacity of the arrangement changes as a result thereof. Now, the oscillator 58 has a coil which forms, together with the capacitive sensor, the oscillator circuit of an oscillator. A discriminator 7, which converts the change in frequency into a change in voltage, is disposed behind the oscillator. The change in voltage is indicative of the change in the load exerted onto the vehicle seat.

The sensor according to FIG. 4 is completely encapsulated as well. It has an exterior sheathing 76 that completely encloses it toward the top (shown in parts only) and an annular protective sheathing 56 provided between the outer electrode 70 and the underbody 18.

The oscillators are operated at a suited frequency in the range of KHz or MHz for example. The inductive sensors may be screened from the outside against stray fields by way of additional means such as special metals. The capacitive sensor may be screened against interfering fields by providing an additional metallic screen; the protective sheathing 56 is preferably metallically conductive.

Figure 2:
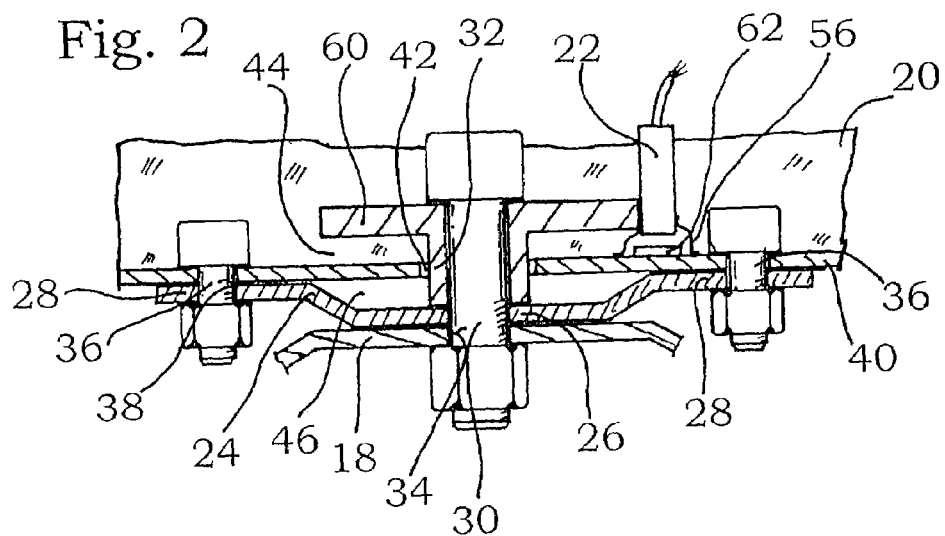
FIG. 2 is a sectional side view with the same section plane as in FIG. 1, but of another embodiment.

It appears that the spring body 24 in the embodiment of FIG. 1 also performs the function of the retaining plate 60 as it is shown in the embodiments according to the FIGS. 2 and 3. Protection will be claimed separately for the retaining plate in connection with the fastening of a spring body, which is completely independent of the configuration of the sensor.

What is claimed is:

1. A device for detecting the weight loaded on a vehicle seat, comprising:

a sensor;

a spring body that connects the vehicle seat to an underbody of a corresponding motor vehicle and is connected, in a first fastening area, with a bottom rail of the vehicle seat and, in a second fastening area, to the underbody of the corresponding motor vehicle, a seat fastening screw which freely protrudes through an opening in the bottom rail of the vehicle seat, the seat fastening screw being detachably but firmly connected to the underbody; and a retaining plate connected to the seat fastening screw, wherein the retaining plate is located above the opening of the bottom rail and straddles the openings of the bottom rail, wherein the seat fastening screw has a head and a shaft, the shaft protruding through the retaining plate via a hole, and the head being wider than the shaft and wider than the hole in the retaining plate to form an overload protection device, and wherein the sensor is a travel sensor which is disposed parallel to the seat fastening screw between the first and second fastening areas or to parts rigidly connected to the first and second fastening areas and which measures the distance of the first and second fastening areas in a direction parallel to the seat fastening screw.

2. The detection device according to claim 1, comprising an inductive transducer provided with a magnet core and a coil, wherein the magnet core is guided within the coil and is movable relative thereto, wherein the magnet core is assigned to one said fastening area, and wherein the coil is assigned to the other said fastening area.

3. The detection device according to claim 2, wherein an elastic protective sheathing which encircles the magnet core is arranged between coil and the one fastening area, or a part firmly connected thereto.

4. The detection device according to claim 1, wherein the spring body is a bent leaf spring.

5. The detection device according to claim 1, wherein the spring body is permanently connected to the bottom rail in one fastening area and wherein the seat fastening screw connects the spring body to the underbody.

6. The detection device according to claim 1, wherein the travel sensor is arranged in an interior space bounded by the bottom rail and one seat rail in engagement with said bottom rail.

7. The detection device according to claim 1, wherein the travel sensor is arranged in a space underneath the underbody.

* * * * *